United States Patent [19]

Fife

[11] Patent Number: 5,743,741
[45] Date of Patent: Apr. 28, 1998

[54] MATH JIGSAW PUZZLE

[76] Inventor: Patricia Fife, 1331 Traynor Rd., Concord, Calif. 94520

[21] Appl. No.: 792,473

[22] Filed: Jan. 31, 1997

[51] Int. Cl.$^6$ .................................................. G09B 19/02
[52] U.S. Cl. .................... 434/205; 434/191; 434/188; 434/406; 273/157 R
[58] Field of Search ..................... 434/205, 207, 434/209, 191, 188, 406, 171, 176, 333; 273/157 R

[56] References Cited

U.S. PATENT DOCUMENTS

| | | | |
|---|---|---|---|
| 723,425 | 3/1903 | Thompson | 434/406 |
| 2,875,531 | 3/1959 | Mansfield | 434/406 |
| 3,171,214 | 3/1965 | Sutherland | 434/333 |
| 3,290,798 | 12/1966 | Gilbert | 434/191 |
| 3,540,732 | 11/1970 | Wilson | 273/157 |
| 3,575,418 | 4/1971 | Palmer | 273/157 |
| 4,076,253 | 2/1978 | Eriksen | 273/157 R |
| 4,360,347 | 11/1982 | Ghaznavi | 434/198 |
| 4,419,081 | 12/1983 | Steinmann | 434/188 |
| 4,422,642 | 12/1983 | Fletcher | 273/157 R |
| 5,022,655 | 6/1991 | Meyeer | 273/157 R |
| 5,545,042 | 8/1996 | Barrows | 434/207 |

*Primary Examiner*—Jeffrey A. Smith

[57] ABSTRACT

An educational jigsaw puzzle (20) in accordance with a first embodiment of the invention including a plurality of substantially flat components (22) having various beginning members (23, 24). Beginning mathematical expressions (26, 27) located on components (24, 25) are directionally combined with same-component expressions (28, 29), and equivalent expressions (30) are located on components (22) with matching edges. These equivalent expressions (30) are then directionally combined with same-component expressions (32), and new equivalent expressions (30) are located on components (22) with matching edges. The process of combining new equivalent expressions with same-component expressions continues until final equivalent expressions (34) are found. Components (22) not containing mathematical expressions are either blank or contain portions of pictures (38). Guidelines (36) and pictorial representations (40) of mathematical expressions may be contained on numerous components (22).

9 Claims, 17 Drawing Sheets

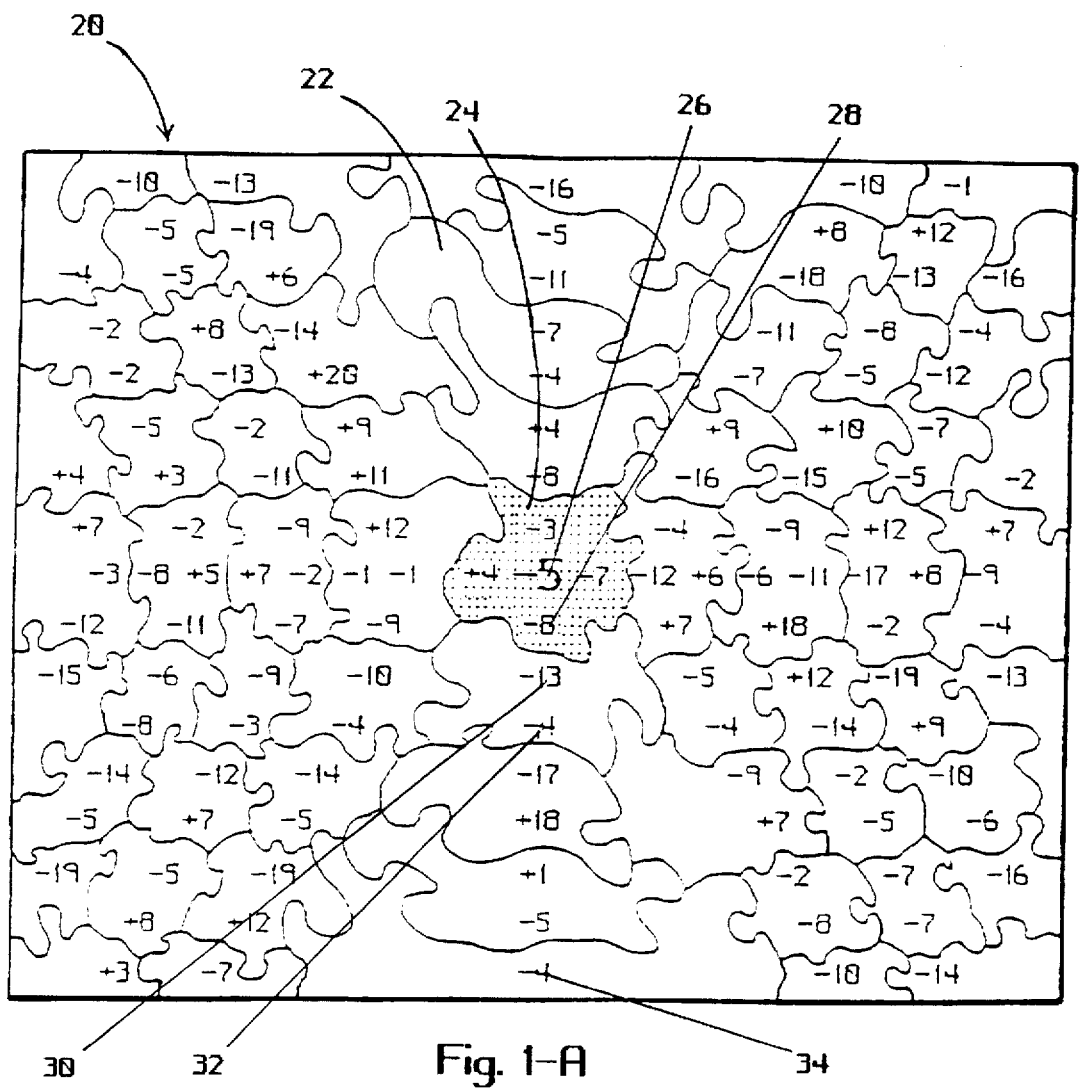
Fig. 1-A

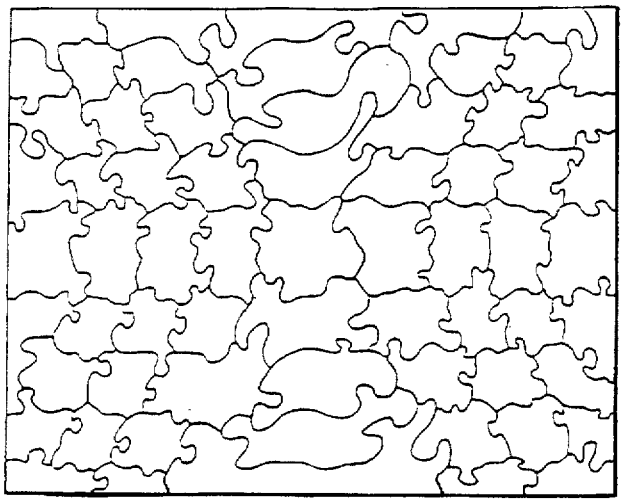
Fig. 1-B
Fig. 1-D
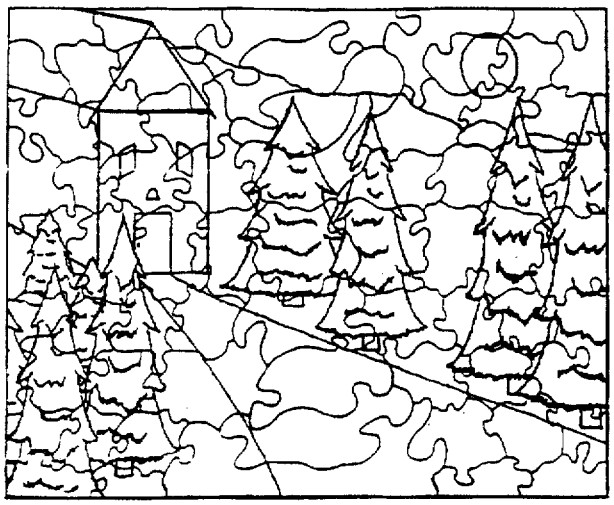
Fig. 1-C
Fig. 1-E

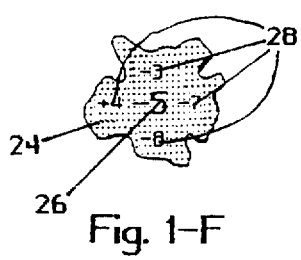
Fig. 1-F
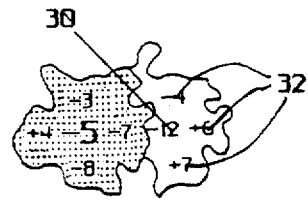
Fig. 1-G
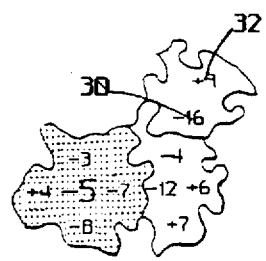
Fig. 1-H
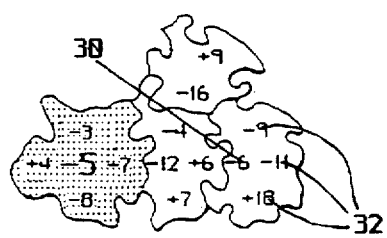
Fig. 1-I
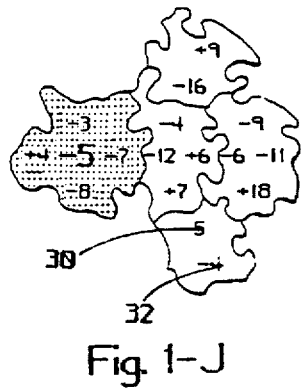
Fig. 1-J
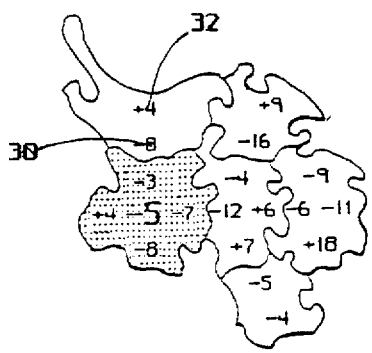
Fig. 1-K
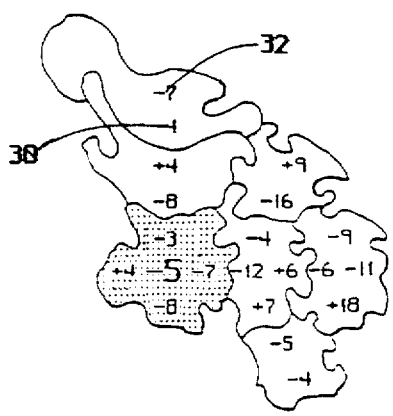
Fig. 1-L

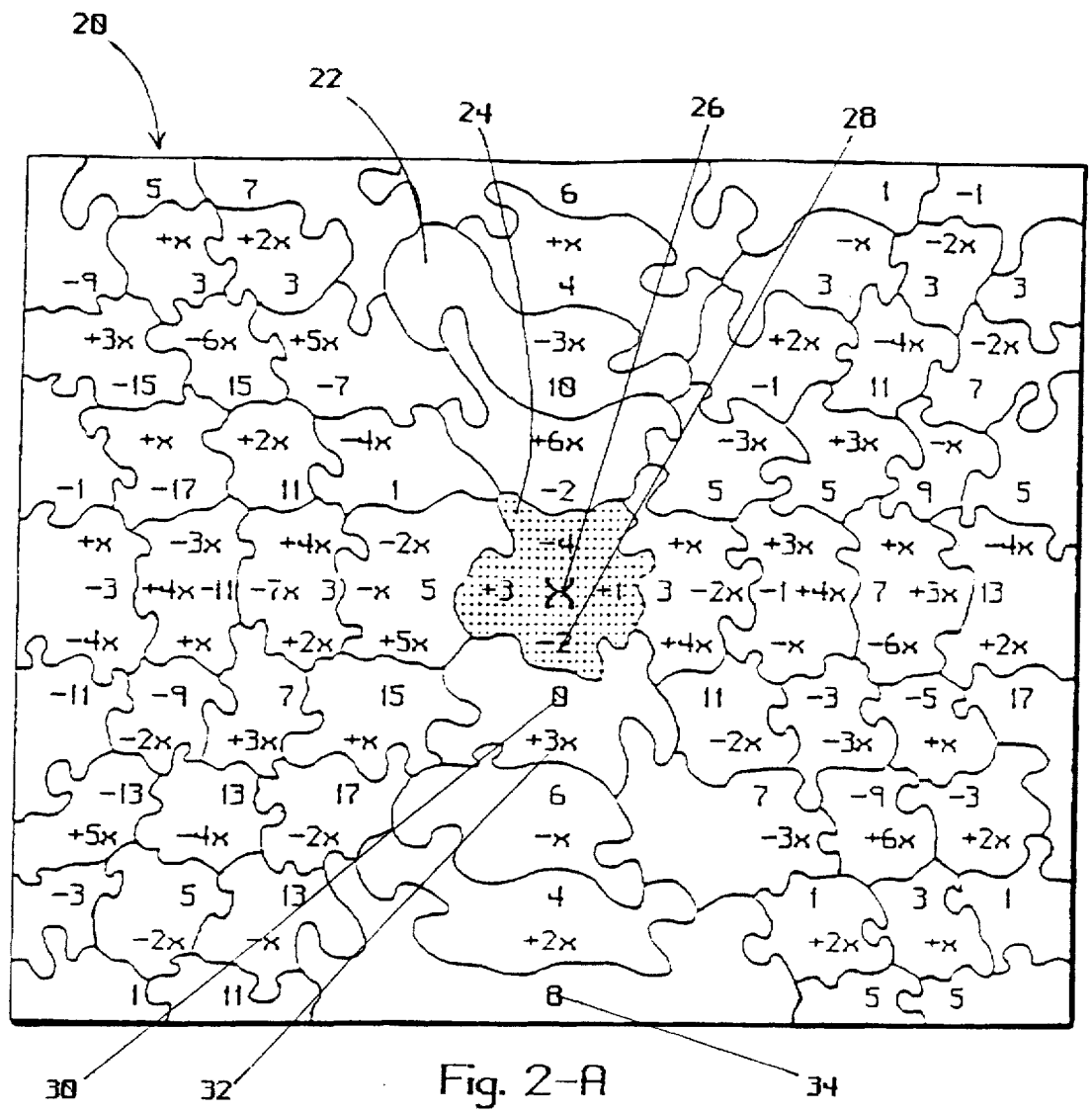
Fig. 2-A

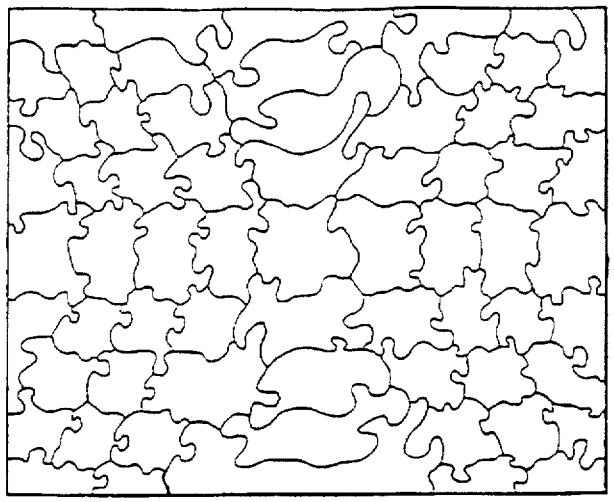
Fig. 2-B
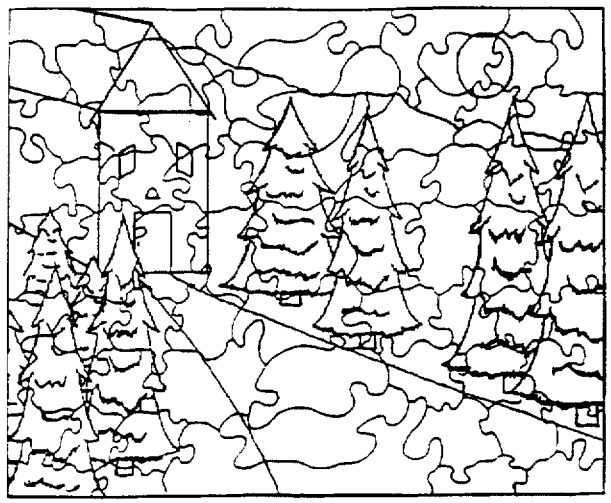
Fig. 2-C
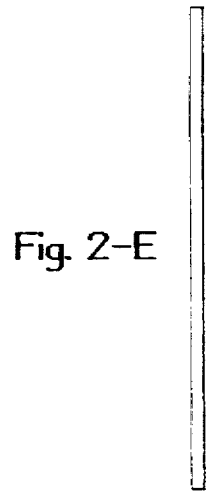
Fig. 2-D
Fig. 2-E

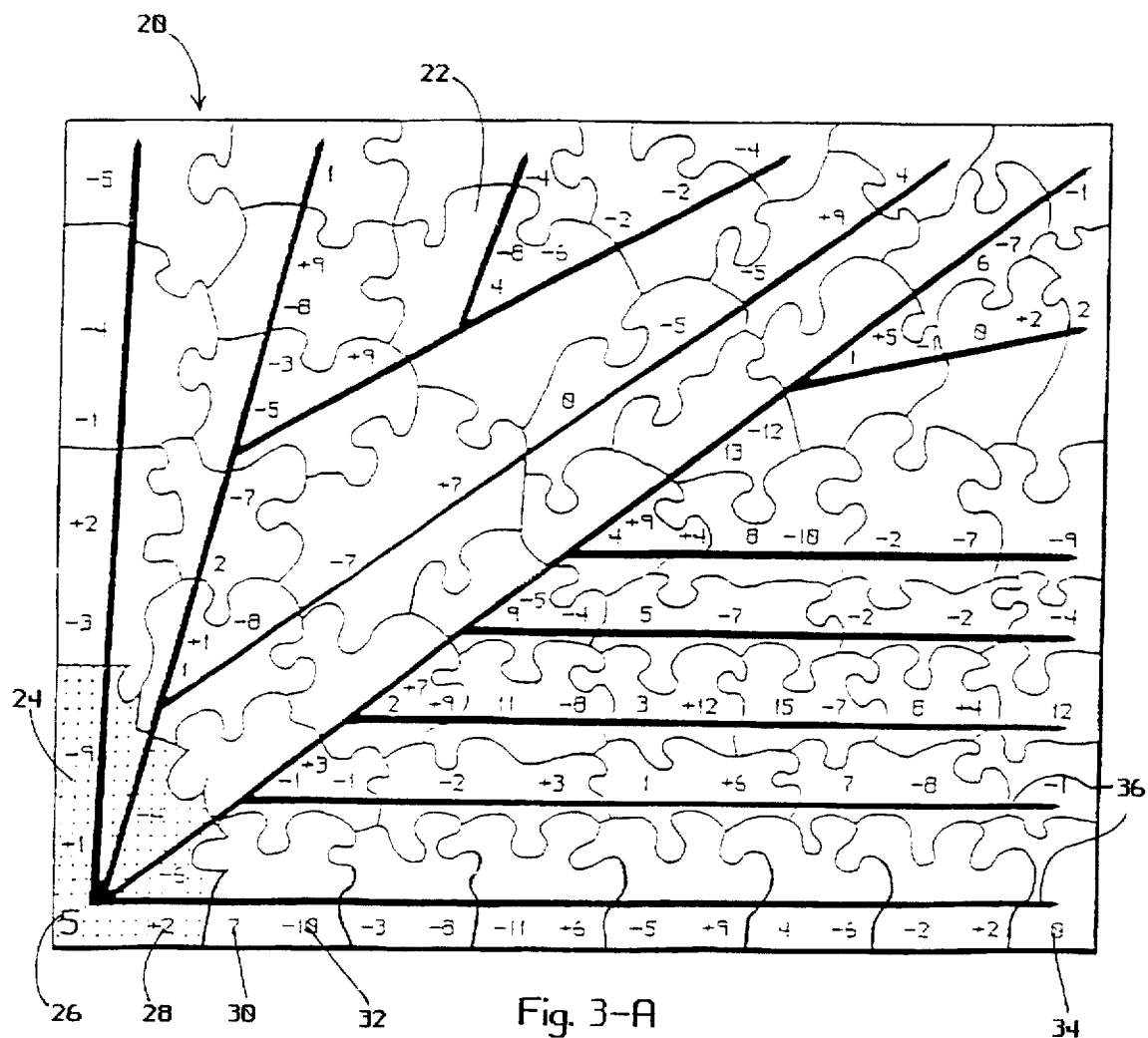
Fig. 3-A

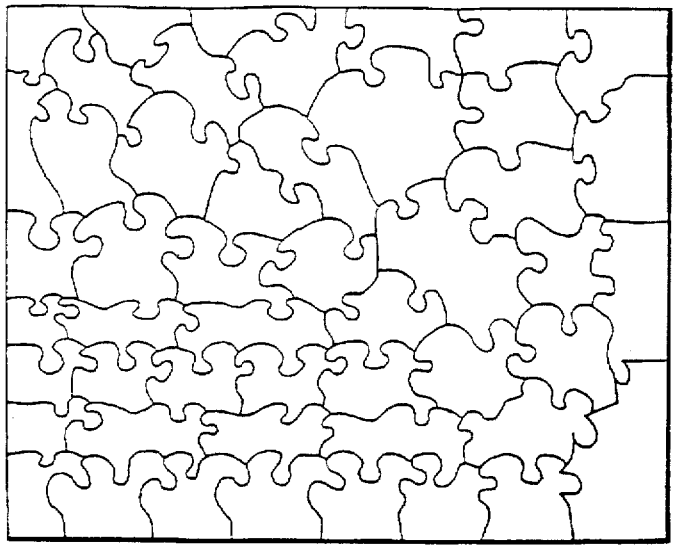
Fig. 3-B
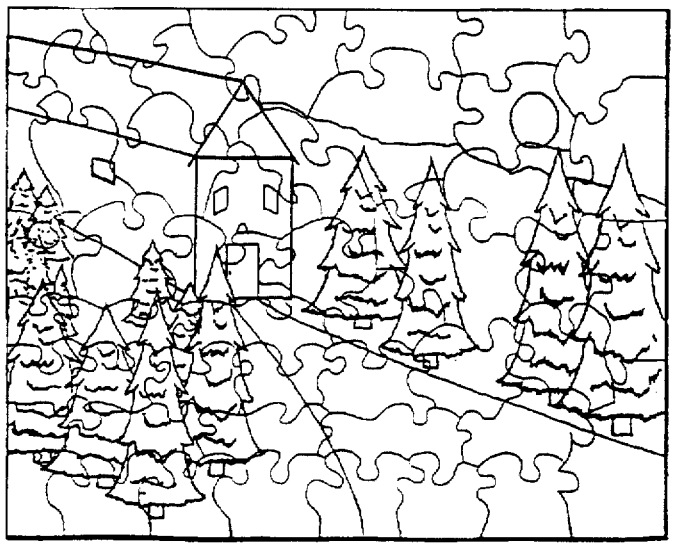
Fig. 3-C
Fig. 3-D
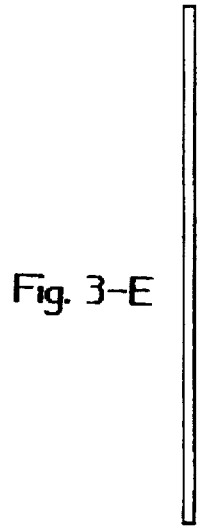
Fig. 3-E

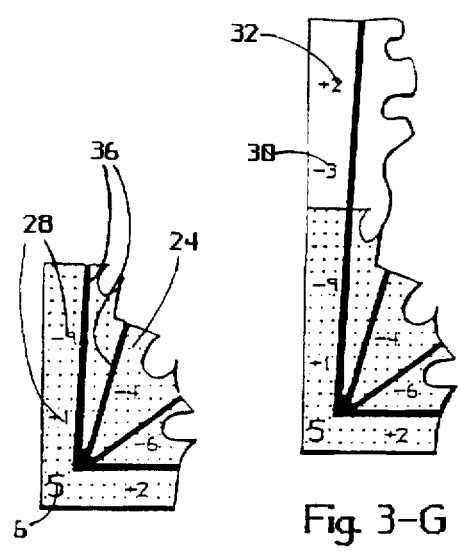
Fig. 3-F
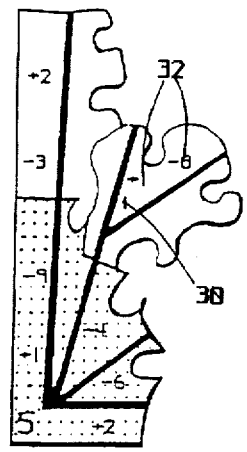
Fig. 3-G
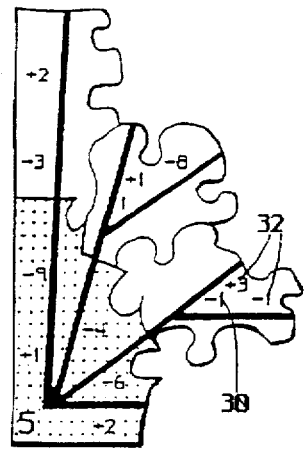
Fig. 3-H
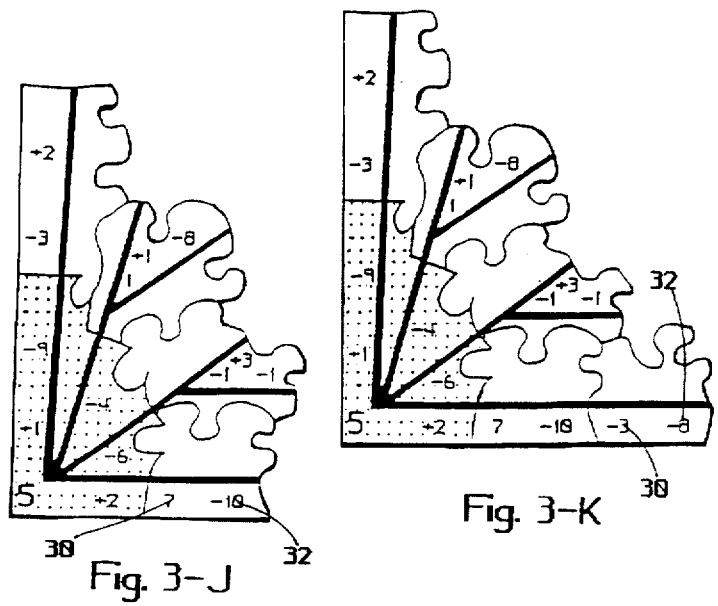
Fig. 3-I
Fig. 3-J
Fig. 3-K
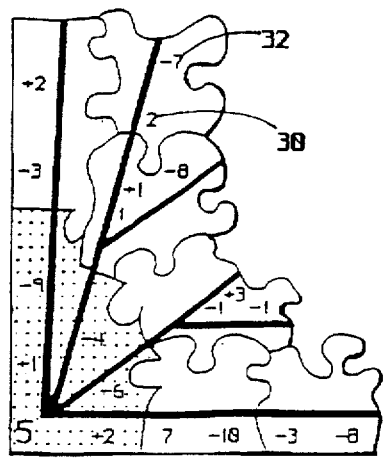
Fig. 3-L

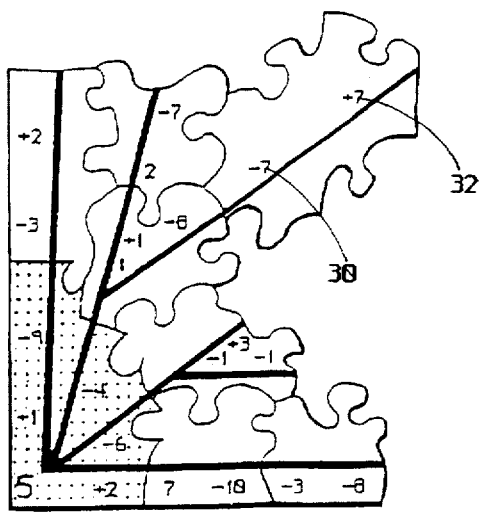
Fig. 3-M
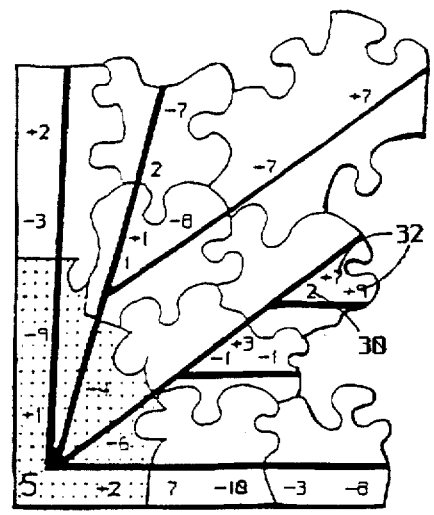
Fig. 3-N
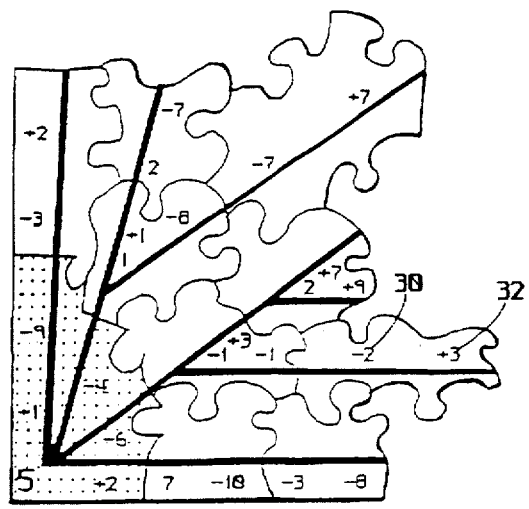
Fig. 3-O
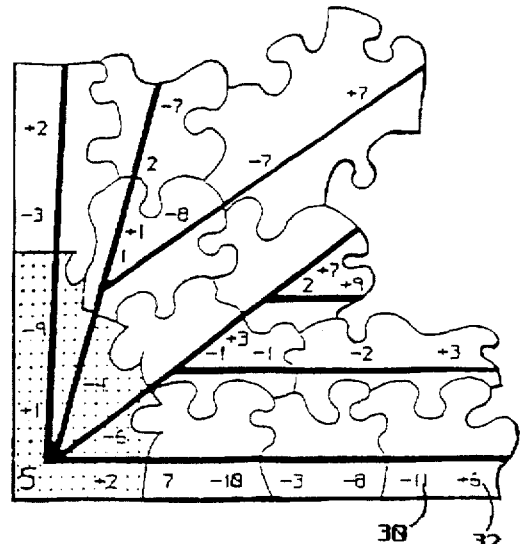
Fig. 3-P

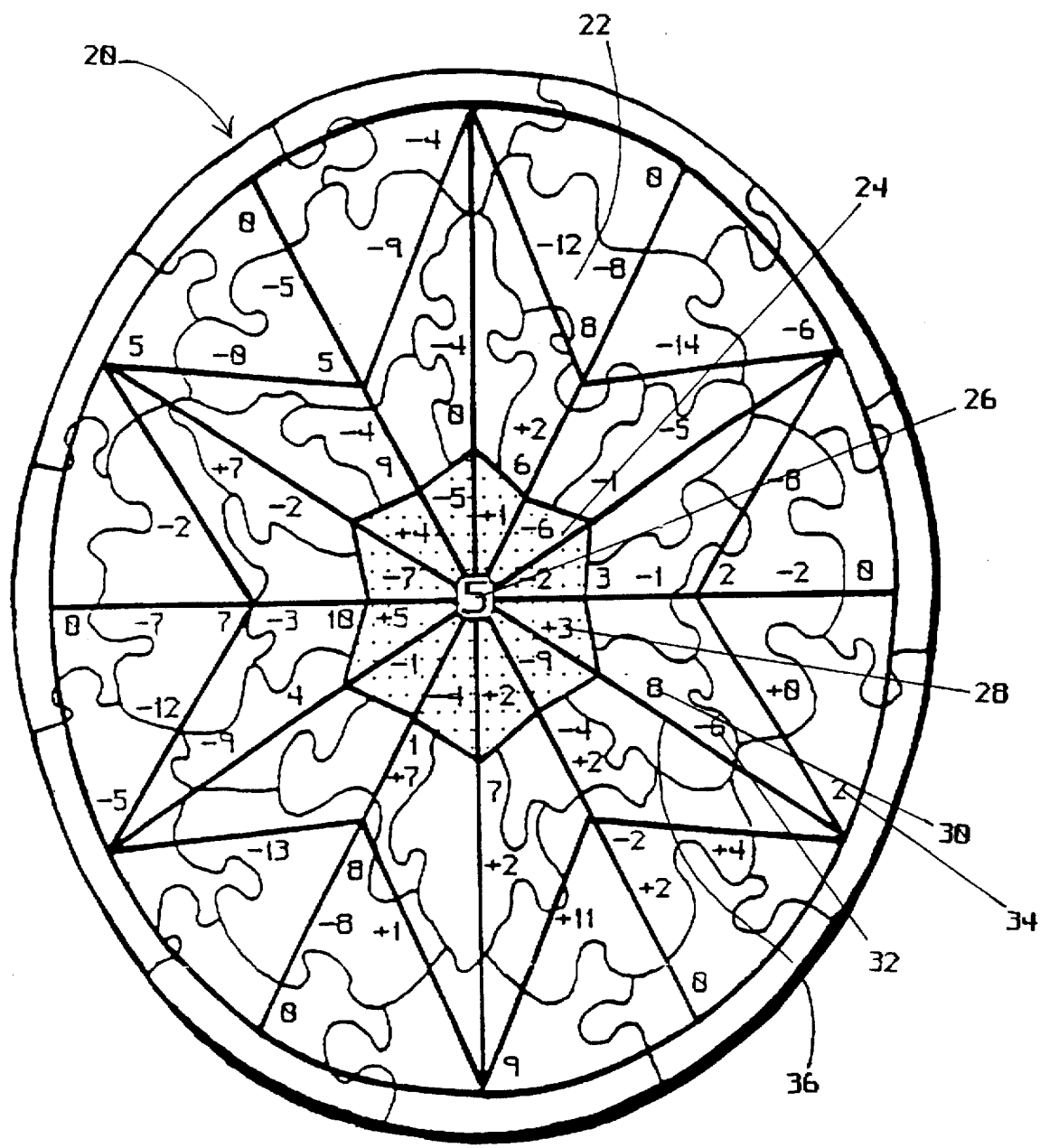
Fig. 4-A

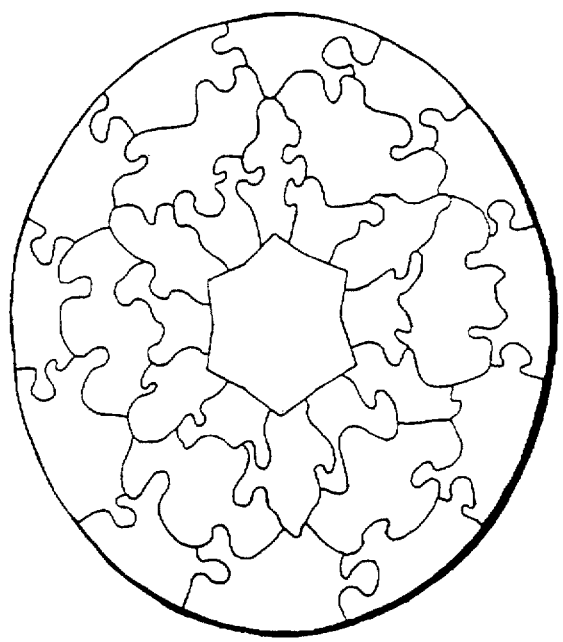
Fig. 4-B
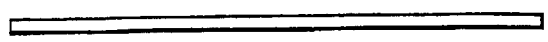
Fig. 4-D
Fig. 4-E
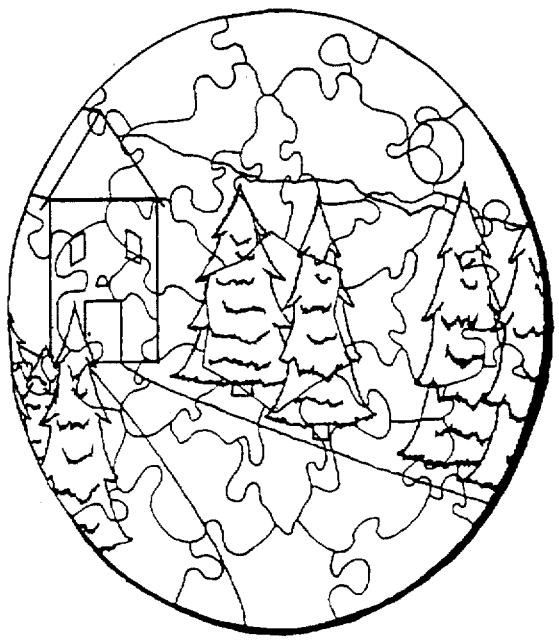
Fig. 4-C

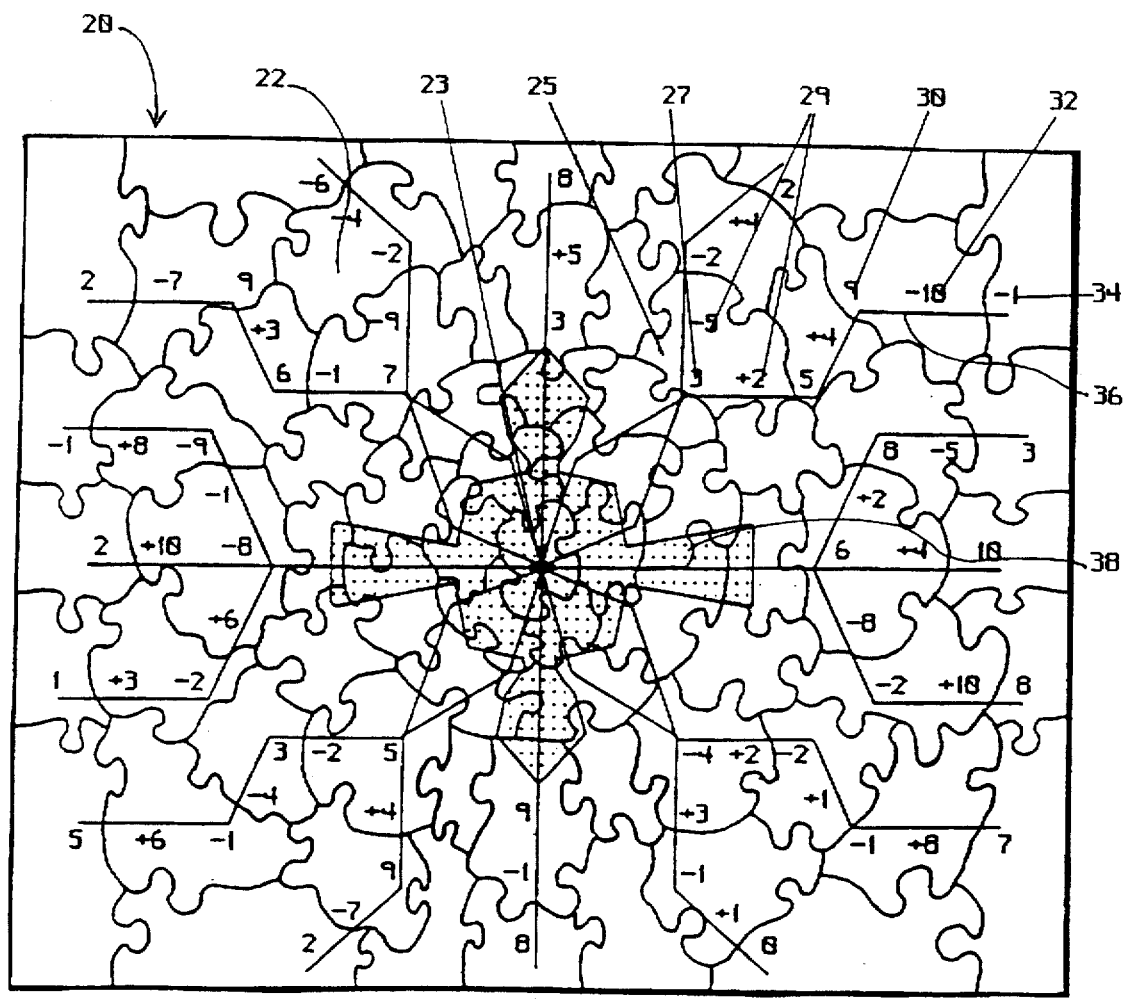
Fig. 5-A

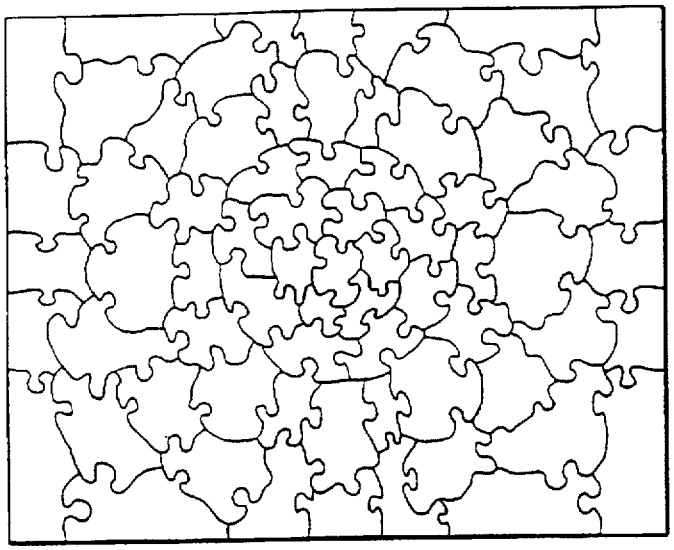
Fig. 5-B
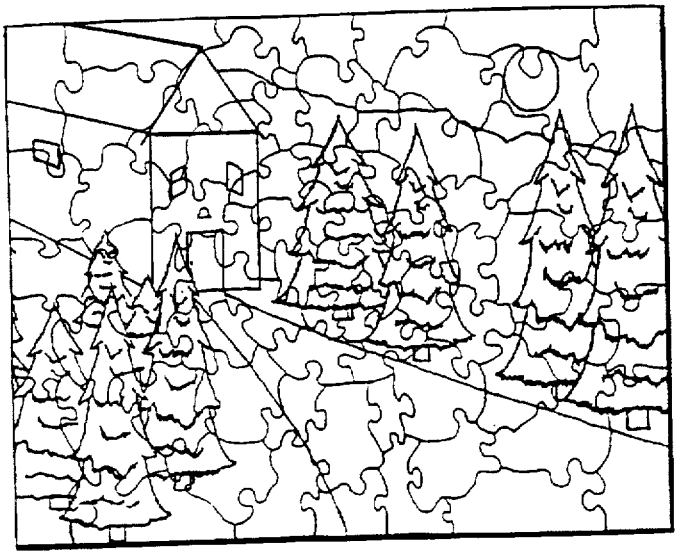
Fig. 5-C
Fig. 5-D
Fig. 5-E

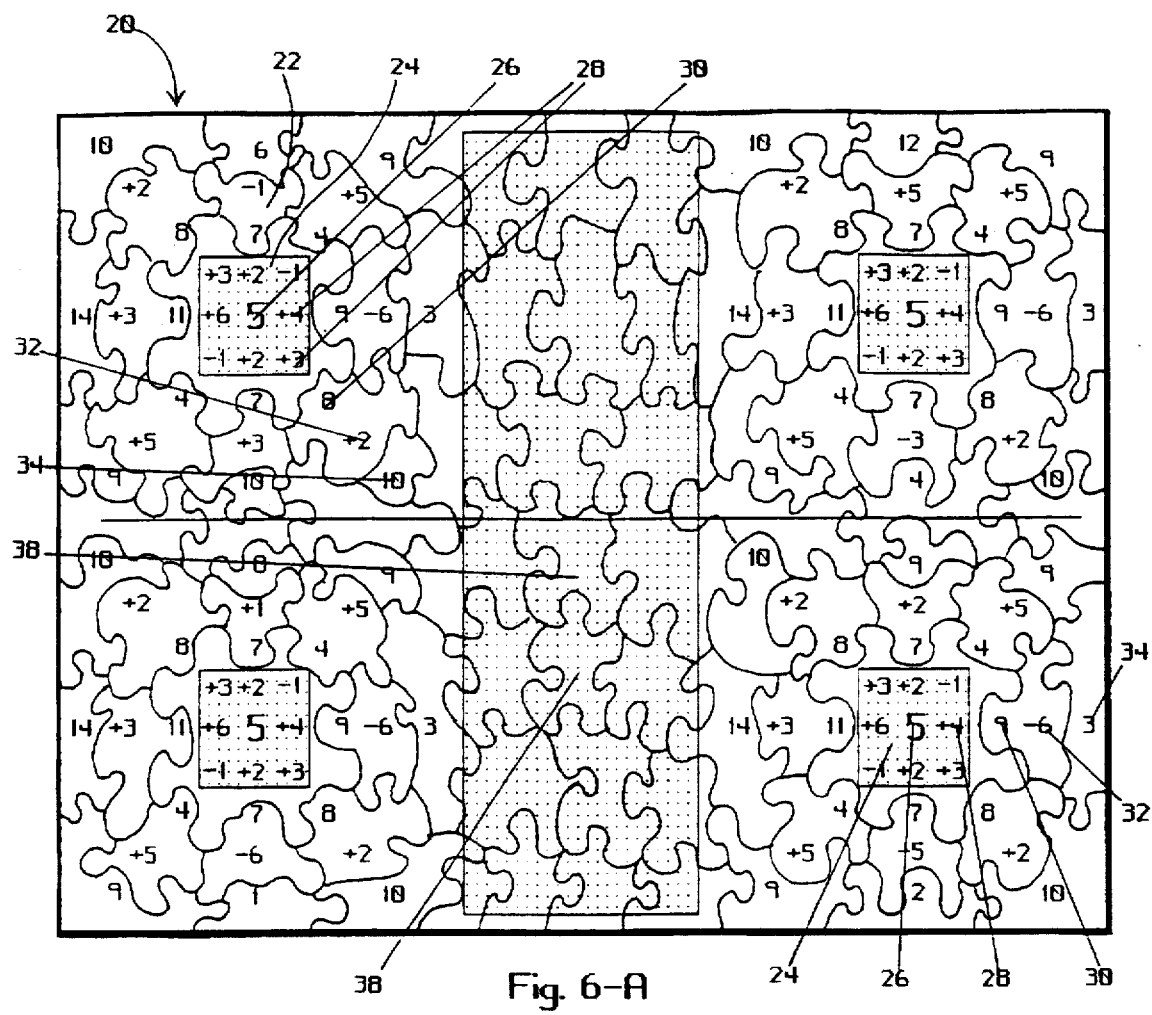
Fig. 6-A

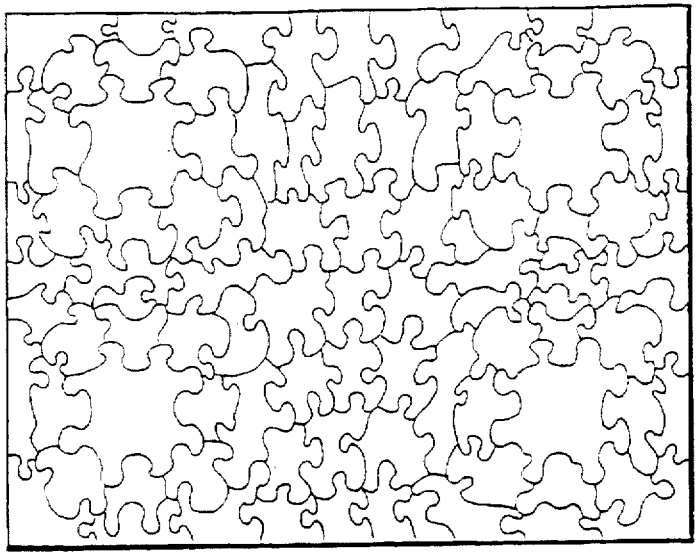
Fig. 6-B
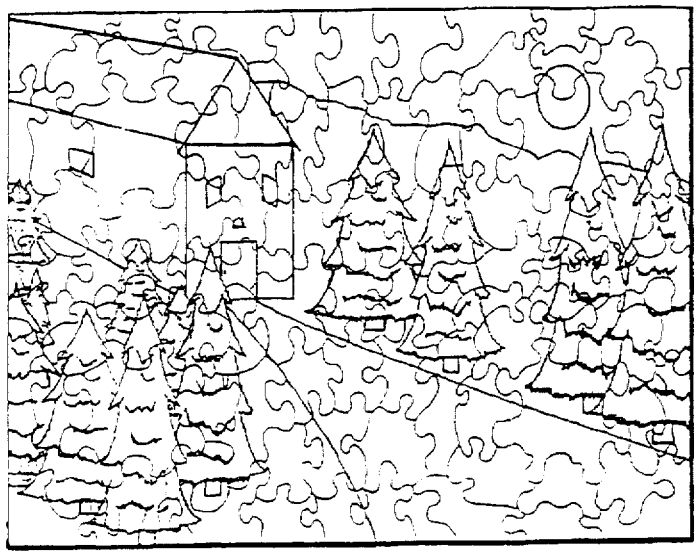
Fig. 6-C
Fig. 6-D
Fig. 6-E

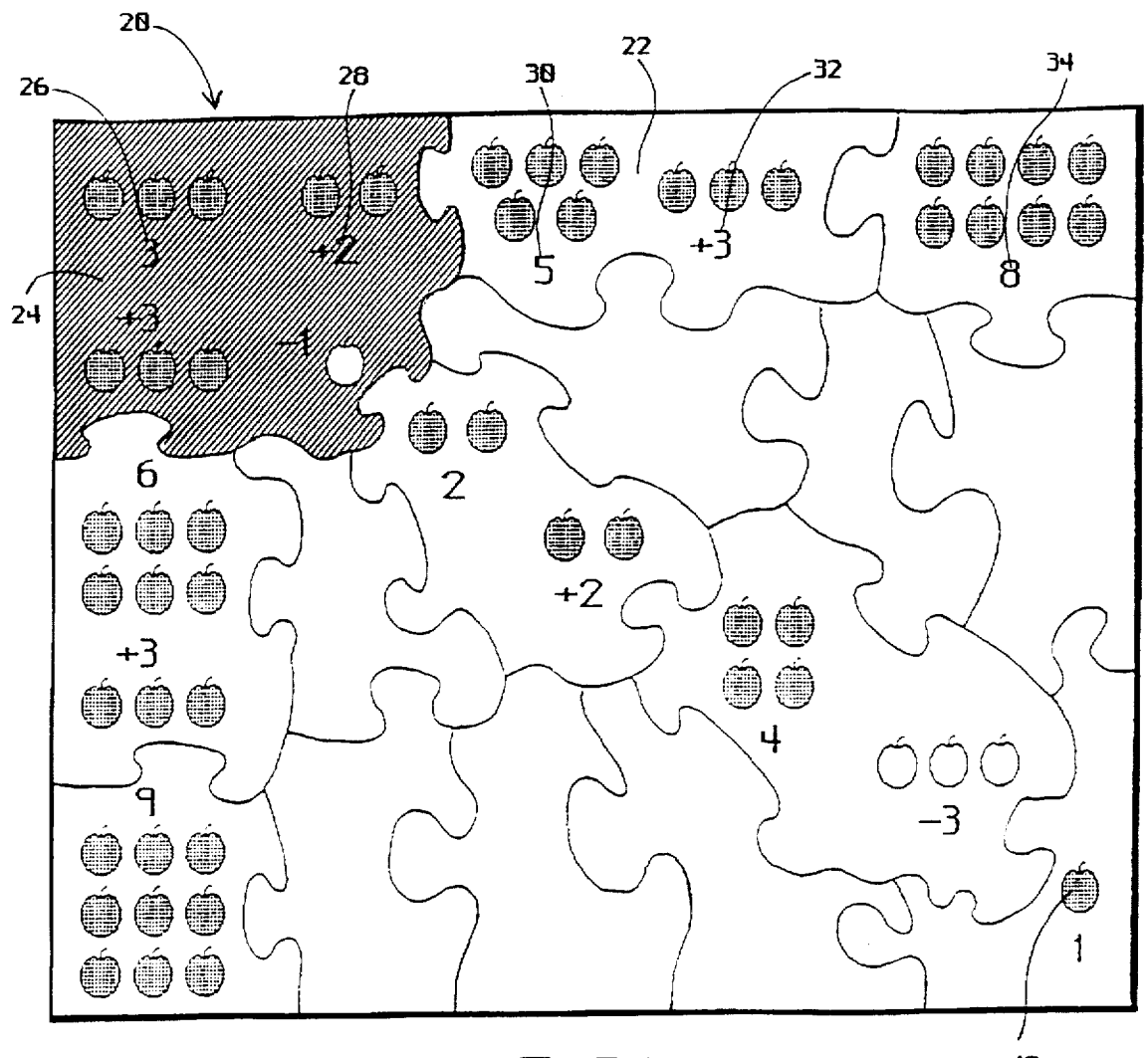
Fig. 7-A

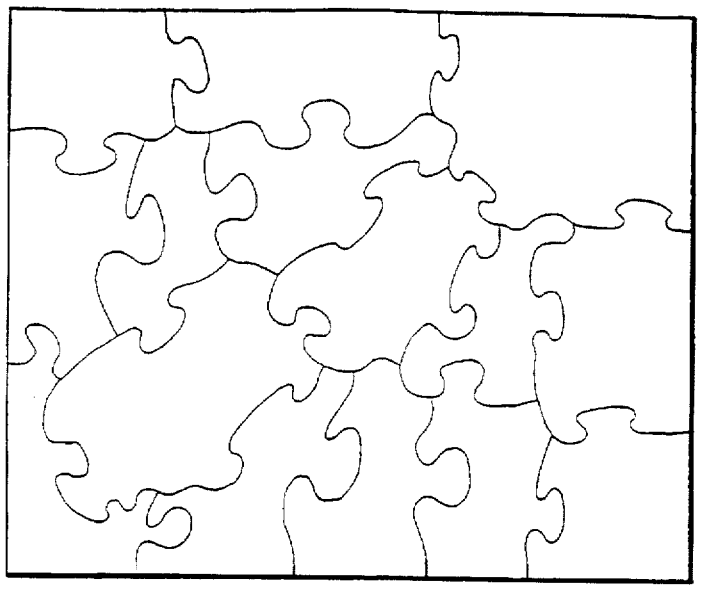
Fig. 7-B
Fig. 7-D
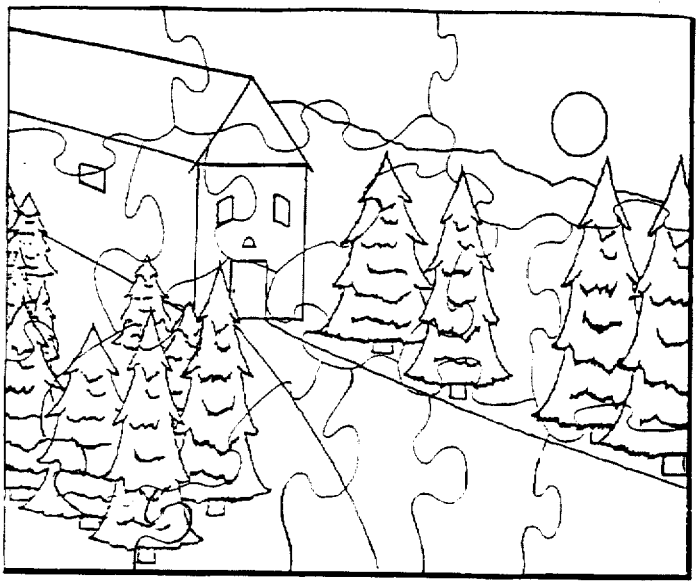
Fig. 7-C
Fig. 7-E

MATH JIGSAW PUZZLE

BACKGROUND

1. Field of Invention

This invention relates to educational equipment and more particularly to an educational jigsaw puzzle useful in teaching and reinforcing mathematical skills.

2. Description of Prior Art

When an individual wants to master any skill or subject in life, the phrase "practice makes perfect" certainly applies. One is well aware of the skilled athlete who practices a routine repeatedly, gaining more and more confidence through repetition. This is especially true of all academic subjects, where mastery of a subject increases through applied use. The more one speaks a new language, the more proficient one becomes. The more one writes, the more literate one becomes. The more a student applies the new-found knowledge of a subject, the more knowledgable he becomes.

The goal of any teacher is not only to impart knowledge, but to increase the students' desire to know more. When a student is able to master a subject, not only does confidence increase, but there is often a desire to know as much as possible of the subject, and to apply it in a positive manner. Teachers have found that students are more receptive to learning when a variety of tools are used, such as class projects, presentations, videos, computers, and games.

The mastery of mathematics at any level is particularly dependent upon practicing newly learned mathematical relationships. By working through problems, and finding correct solutions, a student gains confidence and becomes more adept at problem solving. One crucial element in learning mathematics is having access to correct solutions to problems before attempting similar problems. A student's level of frustration definitely decreases if all attempted problems are solved correctly. If a student can be made aware of an error at the very beginning, there is a greater probability of completing the work successfully. If a student finds a challenge in repeatedly finding correct solutions, his mathematical skill will most definitely increase.

Several puzzles have been invented which attempt to address the problem of challenging the math student, increasing his desire to learn, and stimulating while not overwhelming the student. Assembling the puzzle of U.S. Pat. No. 2,875,531 to Mansfield (1959) tests ones mathematical knowledge, but the mathematical relationships are not visible in the final product. With the device of U.S. Pat. No. 3,290,798 to Gilbert (1966) there is no repetition of problems which would increase learning ability. The puzzles of U.S. Pat. Nos. 3,540,732 to Wilson (1970) and 3,575,418 to Palmer (1971) involve manipulating puzzle pieces, but are unrelated to mathematical relationships. The puzzle of U.S. Pat. No. 4,076,253 to Eriksen (1978) makes use of mathematical relationships, but the problems are separate from one puzzle piece to the next. The mathematical game device of U.S. Pat. No. 4,360,347 to Ghaznavi (1982) is somewhat complicated, and may be frustrating for a younger student to assemble. The puzzle of U.S. Pat. No. 4,422,642 to Fletcher (1983) requires the assembler to fit puzzle pieces together before encountering the mathematical relationships instead of the other way around. The learning board of U.S. Pat. No. 5,545,042 to Barrows (1996) also contains little repetition of problems.

OBJECTS AND ADVANTAGES

Accordingly, several objects and advantages of the present invention are:

(a) to provide a completed puzzle on which mathematical relationships can be viewed;

(b) to provide more repetition of problem solving;

(c) to provide a means of manipulating puzzle pieces while solving mathematical relationships;

(d) to provide a means of becoming aware of the continuity in mathematical relationships; and (e) to provide a simple means of learning, practicing, and testing ones math skills.

Further objects and advantages are to provide a means by which one can learn basic arithmetic with a combination of pictures and numbers, which any level of mathematics can be used to assemble, which little instruction is needed before assembling, which the assembler is given a sense of completing a task when the entire puzzle is assembled, which assembly can be done by parent and child together, which artistic appeal can be made, and which manufacturing can be done with little retooling. Still further objects and advantages will become apparent from a consideration of the ensuing description and drawings.

DRAWING FIGURES

FIG. 1-A discloses a front face of a first embodiment of the invention.

FIG. 1-B discloses a blank back face of a first embodiment.

FIG. 1-C discloses a scene on a back face of a first embodiment.

FIG. 1-D shows a top view of a first embodiment.

FIG. 1-E shows a side view of a first embodiment.

FIG. 1-F shows a beginning component of a first embodiment.

FIGS. 1-G to 1-L show a partial assembly of a first embodiment.

FIG. 2-A discloses a front face of another variation of a first embodiment.

FIG. 2-B discloses a blank back face of another variation of a first embodiment.

FIG. 2-C discloses a scene on a back face of another variation of a first embodiment.

FIG. 2-D shows a top view of another variation of a first embodiment.

FIG. 2-E shows a side view of another variation of a first embodiment.

FIG. 3-A discloses a front face of a second embodiment of the invention.

FIG. 3-B discloses a blank back face of a second embodiment.

FIG. 3-C discloses a scene on a back face of a second embodiment.

FIG. 3-D shows a top view of a second embodiment.

FIG. 3-E shows a side view of a second embodiment.

FIG. 3-F shows a beginning component of a second embodiment.

FIGS. 3-G to 3-P show partial assembly of a second embodiment.

FIG. 4-A discloses a front face of a third embodiment of the invention.

FIG. 4-B discloses a blank back face of a third embodiment.

FIG. 4-C discloses a scene on a back face of a third embodiment.

FIG. 4-D shows a top view of a third embodiment.

FIG. 4-E shows a side view of a third embodiment.

FIG. 5-A discloses a front face of a fourth embodiment of the invention.

FIG. 5-B discloses a blank back face of a fourth embodiment.

FIG. 5-C discloses a scene on a back face of a fourth embodiment.

FIG. 5-D shows a top view of a fourth embodiment.

FIG. 5-E shows a side view of a fourth embodiment.

FIG. 6-A discloses a front face of a fifth embodiment.

FIG. 6-B discloses a blank back face of a fifth embodiment.

FIG. 6-C discloses a scene on a back face of a fifth embodiment.

FIG. 6-D shows a top view of a fifth embodiment.

FIG. 6-E shows a side view of a fifth embodiment.

FIG. 7-A discloses a front face of a sixth embodiment of the invention.

FIG. 7-B discloses a blank back face of a sixth embodiment.

FIG. 7-C discloses a scene on a back face of a sixth embodiment.

FIG. 7-D shows a top view of a sixth embodiment.

FIG. 7-E shows a side view of a sixth embodiment.

REFERENCE NUMERALS IN DRAWINGS 20 educational puzzle constructed in accordance with the concepts of the present invention 22 substantially flat component of 20

23 one of 22 which is a beginning component of 20 designated by contrasting color 24 one of 22 which is a beginning component of 20 designated by contrasting color and mathematical expressions 25 one of 22 which is a beginning point of the mathematical expressions when 23 begins puzzle 26 beginning mathematical expression of 24 designated by size and/or position 27 beginning mathematical expression of 25

28 mathematical expression contained on 24 not including 26

29 mathematical expression contained on 25 not including 27

30 equivalent mathematical expression of a combination of same-component mathematical expressions in a specific direction 32 mathematical expression contained on component 22 not including starting pieces 24 and 25 or equivalent expression 30

34 final equivalent expression in a specific direction 36 guideline indicating direction of mathematical combinations 38 portion of picture contained on component 22

40 pictorial representation of mathematical expression

SUMMARY

Briefly, this educational jigsaw puzzle is assembled in part by combining same-component mathematical expressions in various directions, and locating equivalent mathematical expressions on components with matching edges.

DESCRIPTION OF INVENTION

A first embodiment of the present invention is illustrated in FIG. 1-A (front face) and FIG. 2-A (front face). With continuing reference to the accompanying drawings, reference numeral 20 is used throughout to designate the educational puzzle constructed in accordance with the concepts of the present invention. The puzzle 20 includes a plurality of substantially flat components 22 and may be manufactured of any suitable material such as paper, cardboard, or synthetic materials such as plastic or the like, and be of desired colors. They contain printed material indicating the type of component. Component 24 is one of 22 which begins this type of puzzle. It is of contrasting color and includes the beginning mathematical expression 26 which is of larger size than the other mathematical expressions 28 on it. Equivalent expression 30 to same-component directional combinations are contained on components 22 with physically matching edges. Some components 22 contain only one mathematical expression 34, indicating a final equivalent expression in a specific direction.

A second embodiment of the present invention is illustrated in FIG. 3-A (front face) and FIG. 4-A (front face). Component 24 is one of 22 which begins this puzzle. It is of contrasting color and includes the beginning mathematical expression 26 which is of larger size than the mathematical expressions 28 on it. Mathematical expressions are combined in specific directions according to guidelines 36 present on puzzle pieces. Equivalent expressions 30 to same-component directional combinations indicated by guidelines 36 are contained on components 22 with matching edges. Numerous expressions 32 are also contained on the matching pieces. Some components 22 contain only one mathematical expression 34, indicating a final equivalent expression in a specific direction.

A third embodiment of the present invention is illustrated in FIG. 5-A (front face). Component 23 is one of 22 which begins this puzzle. It has contrasting colors and begins the puzzle as a picture. Components 38 which contain portions of the picture build upon component 23. Component 25 contains mathematical expressions 27 and 29. Mathematical expressions are combined in specific directions according to guidelines 36 located near them. Equivalent mathematical expressions 30 to same-component directional combinations are contained on components 22 with matching edges. Numerous expressions 32 are contained on the matching components. Components 22 which contain only one mathematical expression 34 indicate final equivalent expressions in specific directions.

A fourth embodiment of the present invention is illustrated in FIG. 6-A (front face). Numerous components 24 of 22 begin this type of puzzle. Each is of contrasting color and includes a larger-sized beginning mathematical expression 26 surrounded by other mathematical expressions 28. Equivalent expressions 30 to same-component directional combinations of 26 and 28 are located on components 22 with matching edges. Numerous expressions 32 are also contained these components 22. A component 22 containing only one mathematical expression 34 indicates a final equivalent expression in a specific direction. Components 38 of 22 complete the picture portion of this type of puzzle.

A fifth embodiment of the present invention is illustrated in FIG. 7-A (front face). Component 24 of 22 begins the puzzle. It is of contrasting color and includes pictorial representations 40 of the mathematical expressions 26 and 28. Equivalent mathematical expressions 30 to same-component directional combinations along with their pictorial representations 40 are contained on components 22 with matching edges. Some components 22 contain one mathematical expression 34 with their pictorial representations 40, indicating final equivalent expressions in a specific direction.

OPERATION OF INVENTION

In assembling a puzzle of the first embodiment, as illustrated in FIG. 1-A (front face) and FIG. 2-A (front face), one would begin with component 24. As illustrated by FIG. 1-F, component 24 is of contrasting color, and in this particular puzzle, the beginning mathematical expression 26 is the integer −5 which is sized larger than the mathematical expressions 28 which surround it. The mathematical expressions in this puzzle are integers. One can assemble the puzzle from the mathematical expression 26 in any direction: to the right, left, up or down. Assembling to the right, one combines the integer −5 with −7. The equivalent expression 30 is −12. One must locate the mathematical expression −12 on the remaining puzzle components 22 and physically match the edge of that located piece with the edge of 24 which contains the mathematical expression 28 which is the integer −7. This is illustrated in FIG. 1-G. The equivalent expression 30, which is the integer −12, can now be combined in any of three directions: diagonally upward to the right with the mathematical expression 28 which is the integer −4, directly to the right with the mathematical expression 28 which is the integer +6, or diagonally downward to the right with the mathematical expression 28 which is the integer +7. Combining expression 30 which is the integer −12 diagonally upward to the right with the mathematical expression 28 which is the integer −4, the equivalent expression 30 would be −16. The matching component 22 must contain as the equivalent expression 30 the integer −16, and must physically match along the edge of this component 22. This is illustrated in FIG. 1-H. Combining expression 30 which is the integer −12 directly to the right with the mathematical expression 28 which is the integer +6, the equivalent expression 30 would be −6. The matching component 22 must contain as the equivalent expression 30 the integer −6, and must physically match along the edge of this component 22. This is illustrated in FIG. 1-I. The mathematical expressions 32 on this piece, which are the integers −9, −11, and +18, will later be combined with the equivalent mathematical expression 30 which is the integer −6 to assemble further pieces. Combining the equivalent expression 30 which is the integer −12 diagonally downward to the right with the mathematical expression 28 which is the integer +7, the equivalent expression 30 would be −5. The mathching component 22 must contain as the equivalent expression 30 the integer −5, and must physically match along the edge of this component 22. This is illustrated in FIG. 1-J. Returning to component 24, the beginning piece, the beginning mathematical expression 26, which is the integer −5, can be combined directly upward with the mathematical expression 28, which is the integer −3. The equivalent mathematical expression 30 is the integer −8. The matching component 22 must contain as the equivalent expression 30 the integer −8, and must physically match along the edge of this component 24. This is illustrated in FIG. 1-K. The mathematical expression 32, which is the integer +4, is combined with the equivalent expression 30, which is the integer −8. The matching component 22 must contain as the equivalent expression 30 the integer −4, and must physically match along the edge of this component 22. This is illustrated in FIG. 1-L. One continues assembling the puzzle pieces in this manner. The equivalent mathematical expressions 30 are combined with the other mathematical expresions 32 in all possible directions, and new equivalent expressions 30 are found and pieces are physically matched. When a component 22 contains only one equivalent mathematical expression 34, no more combinations can be made in that specific direction.

FIG. 2-a illustates a puzzle of the first embodiment in which the mathematical expressions are algebraic. In this particular puzzle, the value of x is 2, and this value would be given in the instructions for assembling this puzzle. As with the puzzle containing only integers, one would begin with component 24. The variable x is enlarged, indicating this to be the mathematical expression 26, which is the begining expression for the puzzle. Substituting x=2 in all the algebraic expressions in this puzzle, the puzzle can be assemble in a similar manner as the previous puzzle illustrated in FIG. 1-A.

FIG. 3-A and 4-A illustrate puzzles of the second embodiment in which guidelines are used to indicate the specific directions to combine mathematical expressions. One begins assembling the puzzle with component 24 as in the first embodiment, except guidelines indicate in which specific directions to proceed. As illustrated in FIG. 3-F, component 24 is of contrasting color, and in this particular puzzle, the beginning mathematical expression 26 is the integer 5 which is sized larger than the mathematical expressions 28 which surround it. All the mathematical expressions in this puzzle are integers. One assembles the puzzle from this mathematical expression 26 in specific directions, following the guidelines. Assembling upward, one combines the integer 5 with +1 and −9. The equivalent expression 30 is −3. One must locate it on the remaining puzzle components 22 and physically match that edge piece with the edge of 24 which contains the mathematical expression 28 which is the integer −9. This is illustrated in FIG. 3-G. It should be noted that more than one mathematical expression 28 can be combined with 26 in any direction as long as it lies along the same guideline and is contained on the same puzzle component. The number of mathematical expressions which can be combined in one direction is simply limited by the physical space of the component 22. Assembling along the next guideline, one combines the integer 5 with −4, and locates the equivalent expression 30, the integer 1, on a component 22. The component must also physically match along the edge of component 24. This is illustrated in FIG. 3-F. One manner of assembly is illustrated in FIG. 3-G through FIG. 3-P. When a component 22 contains only one equivalent expression 34, no more combinations can be made in that specific direction.

FIG. 5-A illustrates a puzzle of the third embodiment in which the beginning component 23 contains a portion of a picture. Components 38 build around this beginning piece making up more of the picture until components 25 are encountered. These components 25 contain the beginning mathematical expressions 27. In the upper right portion of this particular puzzle, one would start with the expression 27, which is the integer 3, and following one guideline, combine it with the expression 29, which is the integer −5, or following the other guideline, combine it with the expression 29, which is the integer +2. Equivalent expressions 30, which are respectively the integers −2 and 5, are located on components 22 which physically match the edges. One would continue assembling components 22 along guidelines as in the second embodiment. When a component 22 contains only one equivalent mathematical expression 34, no more combinations can be made in that specific direction. One would locate another component 25 which contains a beginning mathematical expression 27. Following guidelines, one would continue assembling the puzzle 20 until all equivalent expressions 34 are assembled.

FIG. 6-A illustrates a puzzle of the fourth embodiment, which is made up of numerous beginning components 24 which would be assembled as in the first embodiment. This embodiment also contains picture components 38 between the mathematical sections. One could assemble the picture portion separately from the mathematical portion.

FIG. 7-A illustrates a puzzle of the fifth embodiment on which all components 22 containing mathematical expressions also contain pictorial representations 40. Component 24 begins the puzzle, and is of contrasting color. The beginning mathematical expression 26 can be identified by a larger size and/or location on component 24. The mathematical expressions 26 and 28 are combines in specific directions and equivalent mathematical expressions 30 are located. As with the previous embodiments, any component containing the correct expression 30 must also have a physically matching edge. One would continue assembling the puzzle 20 until all components 22 containing equivalent expressions 34 are assembled. The puzzle is completed by components 22 which are blank.

SUMMARY, RAMIFICATIONS, AND SCOPE

Accordingly, the reader will see that the mathematical jigsaw puzzle of this invention provides a simple yet challenging way for any student of mathematics at any level to practice and test their math knowledge. Correct solutions are immediately known. Numerous artistic variations such as color, design, pictorial representations, and overall shape can be applied to the puzzles, offering a wide variety of puzzles to assemble. The puzzles can be assembled either by one student or a group. Parents can assist their children, perhaps offering instruction while helping with the puzzle. Any student of mathematics can assemble a puzzle and feel more confident and satisfied with their math knowledge.

While my above description contains many specificities, these should not be construed as limitations on the scope of the invention, but rather as some exemplifications. Many other variations are possible. For example, a puzzle can be assembled on a computer screen, or a puzzle can be assembled by two or more students as a competitive game.

Thus, the scope of the invention should be determined not by the embodiments illustrated, but by the appended claims and their legal equivalents.

I claim:

1. An educational jigsaw puzzle comprising:

a plurality of components including at least one designated beginning component and a plurality of other components, each of said plurality of components having an irregular side edge for uniquely interfitting with at least one other of said plurality of components, a front face, and a back face;

each said at least one designated beginning component having first indicia means for identifying each such component as a member of a first group;

each of a plurality of said other components having second indicia means for identifying each such component as a member of a second group, said first indicia means and said second indicia means being contrasting so that a member of said first group is distinguishable from a member of said second group;

said front face of each member of said first group having a beginning mathematical expression and a plurality of surrounding mathematical expressions extending therefrom in a plurality of directions, said beginning mathematical expression being of a different size than said surrounding mathematical expressions, and each of said surrounding mathematical expressions being adjacent a respective portion of the edge of said each member of said first group;

said front face of each member of said second group having at least an equivalent mathematical expression adjacent a respective portion of the edge of said each member of said second group, said equivalent mathematical expression being the value of a mathematical combination of all mathematical expressions along a one of said directions from said beginning mathematical expression up to that component of said second group having said equivalent value when the respective portion of the edge of a component having the last mathematical expression of said mathematical combination is positioned in uniquely interfitting relationship with the respective portion of the edge of the component having the equivalent mathematical expression.

2. The educational puzzle as defined in claim 1, further including pictorial indicia on the back face of each of a number of said plurality of components such that a scene is formed upon the correct assembly of the components.

3. The educational puzzle as defined in claim 1, further including guidelines arranged along said plurality of directions to indicate which mathematical expressions are combined.

4. The educational puzzle as defined in claim 3, further including pictorial indicia on the back face of each of a number of said plurality of components such that a scene is formed upon the correct assembly of the components.

5. The educational puzzle as defined in claim 3, further including a design formed by said guidelines.

6. The educational puzzle as defined in claim 5, further including pictorial indicia on the back face of each of a number of said plurality of components such that a scene is formed upon the correct assembly of the components.

7. The educational puzzle as defined in claim 1, further including pictorial representations of mathematical expressions located on a number of said plurality of components.

8. The educational puzzle as defined in claim 7, further including pictorial indicia on the back face of each of a number of said plurality of components such that a scene is formed upon the correct assembly of the components.

9. The educational puzzle as defined in any one of claims 1 to 8, wherein there are a plurality of beginning components.

* * * * *